US012266256B2

(12) United States Patent
Hermann et al.

(10) Patent No.: US 12,266,256 B2
(45) **Date of Patent: *Apr. 1, 2025**

(54) SYSTEM AND METHODS FOR WIRELESS HAND HYGIENE MONITORING

(71) Applicant: Georgia Tech Research Corporation, Atlanta, GA (US)

(72) Inventors: Christopher D. Hermann, Atlanta, GA (US); Russell Scott McCrory, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,633

(22) Filed: Dec. 19, 2023

(65) Prior Publication Data

US 2024/0161596 A1 May 16, 2024

Related U.S. Application Data

(63) Continuation of application No. 17/735,397, filed on May 3, 2022, now Pat. No. 11,893,872, which is a continuation of application No. 17/079,703, filed on Oct. 26, 2020, now Pat. No. 11,348,441, which is a continuation of application No. 16/367,582, filed on Mar. 28, 2019, now Pat. No. 10,847,015, which is a continuation of application No. 14/899,892, filed as application No. PCT/US2014/043278 on Jun. 19, 2014, now Pat. No. 10,282,969.

(60) Provisional application No. 61/836,868, filed on Jun. 19, 2013.

(51) Int. Cl.
*G08B 21/24* (2006.01)

(52) U.S. Cl.
CPC ........... *G08B 21/24* (2013.01); *G08B 21/245* (2013.01)

(58) Field of Classification Search
CPC .............................. G08B 21/24; G08B 21/245
USPC ....................................................... 340/573.1
See application file for complete search history.

(56) References Cited

U.S. PATENT DOCUMENTS

| | | | |
|---|---|---|---|
| 3,940,731 | A | 2/1976 | Cooper |
| 5,202,666 | A | 4/1993 | Knippscheer |
| 5,223,182 | A | 6/1993 | Steiner et al. |
| 5,619,188 | A | 8/1997 | Ehlers |

(Continued)

FOREIGN PATENT DOCUMENTS

| | | | |
|---|---|---|---|
| EP | 1216505 B1 | 6/2006 | |
| KR | 1019940008109 B1 | 9/1994 | |
| KR | 219950009364 Y1 | 10/1995 | |

OTHER PUBLICATIONS

International Search Report and Written Opinion dated Nov. 6, 2014 mailed in International Application No. PCT/US2014/043278 filed on Jun. 19, 2014.

(Continued)

*Primary Examiner* — Kerri L McNally
*Assistant Examiner* — Thang D Tran
(74) *Attorney, Agent, or Firm* — Husch Blackwell LLP; Bryan D. Stewart; Andrew C. Landsman

(57) ABSTRACT

Aspects of the present disclosure generally relate to systems and methods for providing hand hygiene dispenser stations configured to remind users to use the hand hygiene dispenser stations. In one or more embodiments, the present systems and methods provide individual provider identification and networked communication among hand hygiene stations (dispenser stations), enabling tracking of providers and data collection regarding hand hygiene products usage (hand hygiene compliance).

19 Claims, 8 Drawing Sheets

(56) References Cited

U.S. PATENT DOCUMENTS

| | | | | |
|---|---|---|---|---|
| 5,670,945 | A | 9/1997 | Applonie | |
| 5,695,091 | A | 12/1997 | Winings et al. | |
| 5,739,759 | A | 4/1998 | Nakazawa et al. | |
| 6,166,640 | A | 12/2000 | Nishihira et al. | |
| 6,325,245 | B1 | 12/2001 | Matthews | |
| 6,404,837 | B1 * | 6/2002 | Thompson | A47K 5/1217 377/16 |
| 6,727,818 | B1 | 4/2004 | Wildman et al. | |
| 7,375,640 | B1 * | 5/2008 | Plost | G08B 21/245 340/572.1 |
| 7,551,092 | B1 * | 6/2009 | Henry | G08B 21/245 340/286.07 |
| 7,825,812 | B2 | 11/2010 | Ogrin et al. | |
| 9,159,216 | B2 * | 10/2015 | Limbert | G08B 21/245 |
| 10,282,969 | B2 | 5/2019 | Hermann et al. | |
| 10,847,015 | B2 | 11/2020 | Hermann et al. | |
| 2002/0135486 | A1 | 9/2002 | Brohagen et al. | |
| 2002/0150198 | A1 | 10/2002 | Thompson | |
| 2002/0175815 | A1 | 11/2002 | Baldwin | |
| 2004/0078882 | A1 | 4/2004 | Lim | |
| 2004/0090333 | A1 | 5/2004 | Wildman et al. | |
| 2004/0196612 | A1 | 10/2004 | Kraz et al. | |
| 2005/0242942 | A1 | 11/2005 | Staats et al. | |
| 2006/0231568 | A1 * | 10/2006 | Lynn | A47K 5/1202 222/638 |
| 2007/0121319 | A1 | 5/2007 | Wolf et al. | |
| 2007/0182571 | A1 | 8/2007 | Kennish | |
| 2007/0257803 | A1 | 11/2007 | Munro et al. | |
| 2007/0279238 | A1 | 12/2007 | Smith et al. | |
| 2008/0100441 | A1 * | 5/2008 | Prodanovich | B08B 3/04 340/572.1 |
| 2008/0103636 | A1 | 5/2008 | Glenn et al. | |
| 2008/0131332 | A1 | 6/2008 | Nguyen et al. | |
| 2008/0246599 | A1 * | 10/2008 | Hufton | G08B 21/245 340/529 |
| 2009/0051545 | A1 | 2/2009 | Koblasz | |
| 2009/0056011 | A1 | 3/2009 | Wolf | |
| 2009/0119142 | A1 | 5/2009 | Yenni et al. | |
| 2009/0195385 | A1 * | 8/2009 | Huang | G16H 40/20 340/572.1 |
| 2009/0219131 | A1 | 9/2009 | Barnett et al. | |
| 2009/0224907 | A1 | 9/2009 | Sinha | |
| 2009/0224924 | A1 | 9/2009 | Thorp | |
| 2009/0267776 | A1 | 10/2009 | Glenn et al. | |
| 2010/0117836 | A1 * | 5/2010 | Seyed Momen | G16H 40/20 340/573.1 |
| 2010/0123560 | A1 | 5/2010 | Nix | |
| 2010/0134296 | A1 | 6/2010 | Hwang et al. | |
| 2010/0164728 | A1 * | 7/2010 | Plost | G08B 21/245 340/573.1 |
| 2010/0282773 | A1 | 11/2010 | Lynn | |
| 2010/0315244 | A1 * | 12/2010 | Tokhtuev | G08B 21/245 340/603 |
| 2010/0321180 | A1 | 12/2010 | Dempsey | |
| 2010/0328076 | A1 * | 12/2010 | Kyle | G16H 40/20 340/573.1 |
| 2010/0328443 | A1 | 12/2010 | Lynam | |
| 2011/0025509 | A1 | 2/2011 | Brow | |
| 2011/0063106 | A1 | 3/2011 | Snodgrass | |
| 2011/0112696 | A1 | 5/2011 | Yodfat et al. | |
| 2011/0121974 | A1 | 5/2011 | Tenarvitz | |
| 2011/0163870 | A1 | 7/2011 | Snodgrass | |
| 2011/0169646 | A1 | 7/2011 | Raichman | |
| 2011/0227740 | A1 | 9/2011 | Wohltjen | |
| 2011/0234407 | A1 | 9/2011 | Harris et al. | |
| 2011/0234598 | A1 | 9/2011 | Scarola et al. | |
| 2011/0254682 | A1 * | 10/2011 | Sigrist Christensen | G16H 40/20 340/539.12 |
| 2011/0291840 | A1 | 12/2011 | Pelland et al. | |
| 2011/0291841 | A1 | 12/2011 | Hollock | |
| 2011/0310071 | A1 | 12/2011 | Segall et al. | |
| 2011/0316701 | A1 * | 12/2011 | Alper | G08B 21/245 340/573.1 |
| 2011/0316703 | A1 | 12/2011 | Butler | |
| 2012/0062382 | A1 * | 3/2012 | Taneff | G08B 21/245 340/573.1 |
| 2012/0075464 | A1 | 3/2012 | Derenne | |
| 2012/0112906 | A1 | 5/2012 | Borke | |
| 2012/0194338 | A1 | 8/2012 | Snodgrass | |
| 2012/0218106 | A1 | 8/2012 | Zaima et al. | |
| 2012/0245729 | A1 | 9/2012 | Wegelin et al. | |
| 2012/0245951 | A1 * | 9/2012 | Gips | G16H 40/20 705/14.1 |
| 2012/0316497 | A1 | 12/2012 | Deutsch | |
| 2013/0025714 | A1 | 1/2013 | Hermann | |
| 2013/0027199 | A1 | 1/2013 | Bonner | |
| 2013/0046153 | A1 | 2/2013 | Hyde et al. | |
| 2013/0099929 | A1 | 4/2013 | Ophardt et al. | |
| 2013/0113291 | A1 | 5/2013 | Recker et al. | |
| 2013/0122807 | A1 | 5/2013 | Tenarvitz et al. | |
| 2013/0229276 | A1 | 9/2013 | Hunter | |
| 2013/0250823 | A1 | 9/2013 | Gaylard et al. | |
| 2013/0257615 | A1 | 10/2013 | Iseri | |
| 2013/0262034 | A1 | 10/2013 | Iseri et al. | |
| 2013/0268293 | A1 | 10/2013 | Knudson | |
| 2013/0331153 | A1 | 12/2013 | Krimstock | |
| 2013/0342349 | A1 * | 12/2013 | Cruz | G06Q 10/10 705/2 |
| 2014/0070950 | A1 | 3/2014 | Snodgrass | |
| 2014/0225732 | A1 * | 8/2014 | Limbert | G16H 40/20 340/540 |
| 2014/0253334 | A1 * | 9/2014 | Hanlin | G08B 21/245 340/573.1 |
| 2014/0266730 | A1 | 9/2014 | Hines et al. | |
| 2014/0279603 | A1 | 9/2014 | Ortiz et al. | |
| 2014/0297371 | A1 | 10/2014 | Colburn | |
| 2014/0327545 | A1 * | 11/2014 | Bolling | G08B 21/245 340/573.1 |
| 2014/0333744 | A1 | 11/2014 | Baym | |
| 2014/0361897 | A1 | 12/2014 | Smith et al. | |

OTHER PUBLICATIONS

International Search Report dated Dec. 23, 2011 mailed in International Application No. PCT/US2011/031571 filed on Apr. 7, 2011.

* cited by examiner

SYSTEM AND METHODS FOR WIRELESS HAND HYGIENE MONITORING

This application is a continuation of U.S. Non-Provisional patent application Ser. No. 17/735,397, filed May 3, 2022, entitled, "System and Methods for Wireless Hand Hygiene Monitoring," which is a continuation of U.S. Pat. No. 11,348,441, filed Oct. 26, 2020, entitled, "System and Methods for Wireless Hand Hygiene Monitoring," which is a continuation of U.S. Pat. No. 10,847,015, filed Mar. 28, 2019, entitled, "System and Methods for Wireless Hand Hygiene Monitoring," which is a continuation of U.S. Pat. No. 10,282,969, filed Dec. 18, 2015 entitled, "System and Methods for Wireless Hand Hygiene Monitoring," which is a national stage application that claims the benefit of and priority under 35 U.S.C. § 371 to International Application No. PCT/US2014/043278 entitled "System and Methods for Wireless Hand Hygiene Monitoring." filed on Jun. 19, 2014, and which claims the benefit of U.S. Provisional Patent Application No. 61/836,868, filed Jun. 19, 2013, entitled, "Wireless Hand Hygiene Monitoring System," each of which are incorporated herein by reference in their entirety.

BACKGROUND

Poor hand hygiene compliance is reportedly a major cause of the spread of hospital acquired infections (HAIs). Roughly 2.1 million HAIs lead to over 100,000 deaths and cost the healthcare system roughly $4.5 billion, annually. Despite the importance of hand hygiene compliance, providers reportedly only practice good hand hygiene between 25-60% of the time.

Therefore, there is a long felt but unmet need for a system or method that improves hand hygiene compliance. Further, there is need for a system or method that tracks and collects hand hygiene compliance data. Various embodiments of the present systems and methods recognize and address the foregoing considerations.

BRIEF SUMMARY OF THE DISCLOSURE

Various embodiments of the present disclosure include a system for tracking and improving hand hygiene including: 1) at least one sensor for detecting when an action is performed to receive a hand hygiene product, the at least one sensor operatively coupled to at least one processor; and 2) a proximity sensor for determining when an object is within a predefined distance from a hand hygiene product dispenser, the proximity sensor operatively connected to the at least one processor, wherein the at least one processor is operatively configured to: A) receive, from the proximity sensor, a proximity indication that a particular object is within the predetermined distance; B) upon receiving the proximity indication, determining whether the at least one sensor detects the action to receive the hand hygiene product within a predetermined time period or process; and C) upon determining that the at least one sensor did not detect the action to receive the hand hygiene product within the predetermined time period, facilitating transmission of at least one message.

One or more embodiments of the present disclosure include a computer-implemented method for tracking and improving hand hygiene including providing: 1) at least one sensor for detecting when a user performs an action to receive a hand hygiene product, the at least one sensor operatively coupled to at least one processor; 2) an electromechanical usage sensor for detecting when the hand hygiene product is low, the electromechanical usage sensor operatively coupled to the at least one processor; and 3) memory operatively coupled to the at least one processor, wherein the at least one processor is configured for: A) upon receiving a notification from the electromechanical usage sensor that the hand hygiene product is low, transmitting, by the at least one processor, a low hand hygiene product notification; 9) receiving, by the at least one processor, from an ultrasound proximity sensor, a proximity indication that an object is within a predetermined distance of the ultrasound proximity sensor; C) upon receiving the proximity indication, transmitting, by the at least one processor, a low energy Bluetooth broadcast; D) based on transmitting the low energy Bluetooth broadcast, receiving, by the at east one processor, one or more unique addresses; E) determining, by the at least one processor, whether the at least one sensor detects a user performing the action within a predetermined time period; and F) upon determining that the at least one sensor did not detect the user performing the action within the predetermined time period: i) facilitating, by the at least one processor, playing an audio indication for the user to perform the action; and ii) logging, by the at least one processor, the one or more unique addresses in memory with an indication that the at least one sensor did not detect the user performing the action within the predetermined time period.

At least one embodiment of the present disclosure includes a first and second hand hygiene detection apparatus, the first hand hygiene detection apparatus including: 1) a low power digital radio operatively connected to at least one processor configured to receive information from the second hand hygiene detection apparatus and/or from a data server; and 2) memory operatively coupled to the at least one processor, wherein the at least one processor is operatively configured for: A) receiving a dispensing event indication, via the digital radio, that a dispensing event associated with a particular unique addresses occurred at the second hand hygiene detection apparatus; B) storing the dispensing event indication in memory; C) receive, from an ultrasound proximity sensor, a proximity indication that an object is within a predetermined distance of the dispenser; D) upon receiving the proximity indication: i) transmitting a proximity indication to at least one receiver; and ii) based on transmitting the proximity indication, receiving one or more unique addresses; E) determining whether the one or more unique addresses includes the particular unique address; F) upon determining that the one or more unique addresses includes the particular unique address, determining whether the dispensing event occurred within a predetermined amount of time; G) upon determining that the dispensing event did not occur within the predetermined amount of time or upon determining that the one or more unique addresses does not include the particular unique address, facilitating playing of an audio reminder.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

DETAILED DESCRIPTION

Overview

Figure 1:
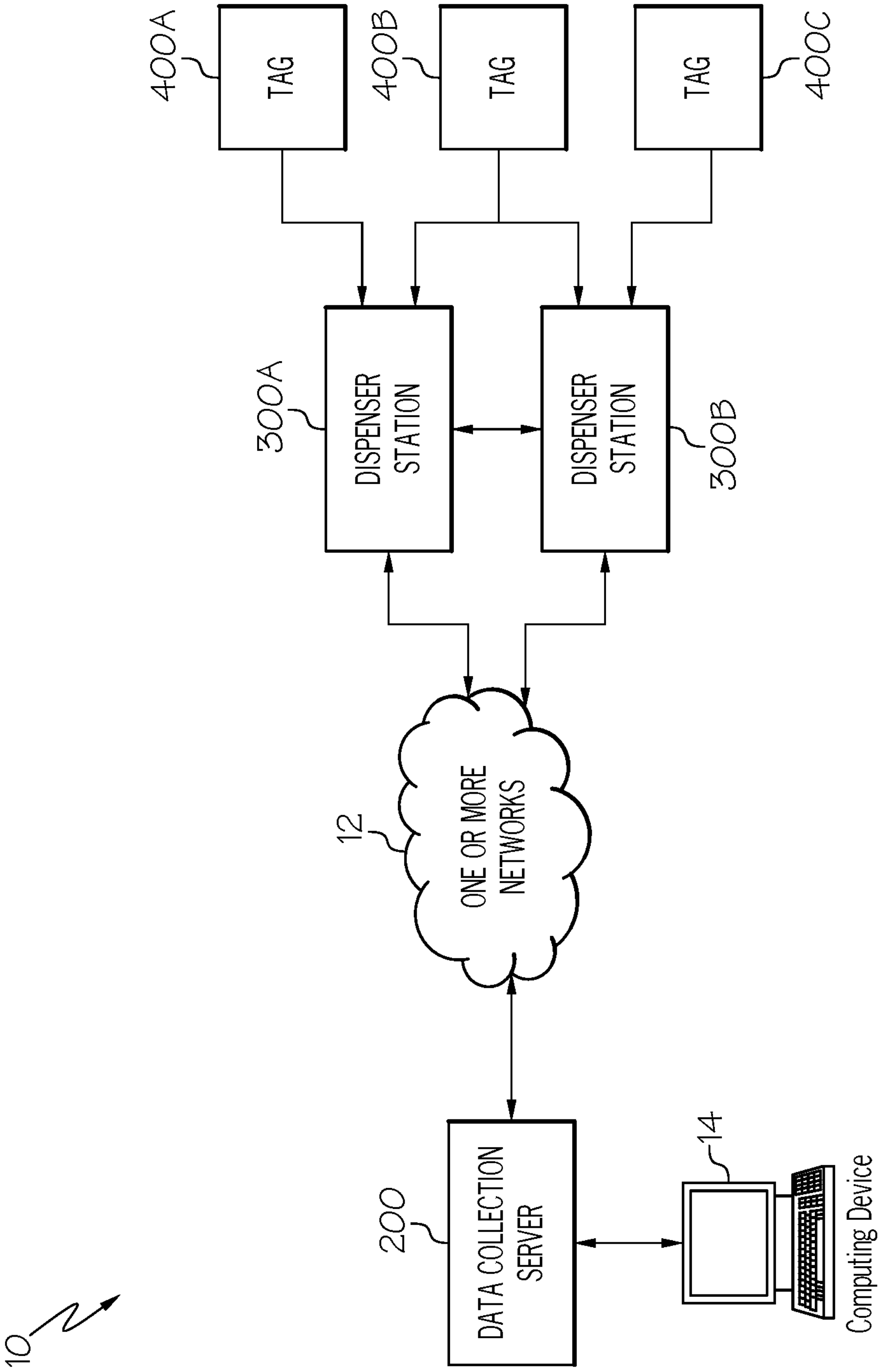
FIG. 1 is an exemplary hand hygiene monitoring system constructed in accordance with various embodiments of the present disclosure.

This application incorporates by reference U.S. patent application Ser. No. 13/639,669, entitled "SYSTEMS FOR MONITORING HAND SANITIZATION", filed on Oct. 5, 2012, the disclosure of which is incorporated by reference as if the same were fully set forth herein.

Aspects of the present disclosure generally relate to systems and methods for providing hand hygiene dispenser stations configured to remind users to use the hand hygiene dispenser stations. In one or more embodiments, the present systems and methods provide individual provider identification and networked communication among hand hygiene stations (dispenser stations), enabling tracking of providers and data collection regarding hand hygiene product usage (hand hygiene compliance).

Accordingly, in a particular embodiment, the present systems and methods include: 1) at least one sensor for detecting when an action is performed to receive a hand hygiene product, the at least one sensor operatively coupled to at least one processor; and 2) a proximity sensor for determining when an object is within a predefined distance from a hand hygiene product dispenser, the proximity sensor operatively connected to the at least one processor. In various embodiments, the at least one processor is operatively configured to: a) receive, from the proximity sensor, a proximity indication that a particular object is within the predetermined distance; and b) upon receiving the proximity indication, determining whether the at least one sensor detects the action to receive the hand hygiene product within a predetermined time period; and c) upon determining that the at least one sensor did not detect the action to receive the hand hygiene product within the predetermined time period, facilitating transmission of at least one message.

According to one or more embodiments, identification of individual providers is based on active communication between a tag that each individual provider wears (e.g., as part of an identification badge, embedded in the identification badge reel, etc.) as well as the dispenser station. In particular embodiments, each tag comprises at least one processor configured for transmitting the one or more unique addresses, among other functionality as discussed herein. In various embodiments, the tag also includes an RE chip, an antenna, and a battery.

In at least one embodiment, the dispenser station detects an individual walking by the device via a proximity sensor and transmits a signal to the tag requesting transmission of a unique identifier. In these embodiments (and others), the system records (or logs) the unique identifier (e.g., at the dispenser station) along with hand hygiene activity for that for unique identifier, and thus, for the individual (e.g., information regarding whether the individual used the hand hygiene product).

Further, aspects of the present disclosure relate to tracking individuals and/or tags via a network of dispenser stations. In various embodiments, a dispenser station identifies the range between the providers and the base station, which may be used to detect when an individual enters or exits a room (e.g., a patient's room). In particular embodiments, the system is configured to detect when the individual enters or exits the room by proximity to one dispenser station or by range information from multiple dispenser stations.

It should be understood that these networked dispenser stations and tags create a mesh network that can be useful in almost any setting. The following illustrates exemplary embodiments of the present systems and methods including exemplary computer architecture and a number of examples of functionality of the present systems and methods.

Exemplary Architecture

FIG. 1 depicts a high-level exemplary architecture 10 of various systems and methods disclosed herein. As shown in the embodiment in FIG. 1, the system includes a computing device 14 operatively connected to a data collection server 200. Data collection server 200 (further discussed in relation to FIG. 2) is, in the embodiment shown, operatively connected to dispenser station 300A and 300B via one or more networks 12. Dispenser station 300A is operatively connected to dispenser station 300B and tags 400A and 400B. Dispenser station 300B is operatively connected to dispenser station 300A and tags 400B and 400C. Dispenser stations 300A and 300B and tags 400A, 400B, and 400C are merely exemplary. It will be understood by one of ordinary skill in the art that the system may include any number of networks, dispenser stations, tags, data collections servers, and/or computing devices.

In general, in the exemplary embodiment of FIG. 1, each of the devices shown are in operative communication with various other devices. It should be understood, and will be further discussed herein, that various components may be operatively connected in ways not shown in FIG. 1. Additionally, although only one or more networks 12 are shown, it will be understood that the system may include any number of suitable networks, which may be, for example, wireless networks, directly connected (e.g., wired), or any other suitable type of network.

Data Collection Server

Figure 2:
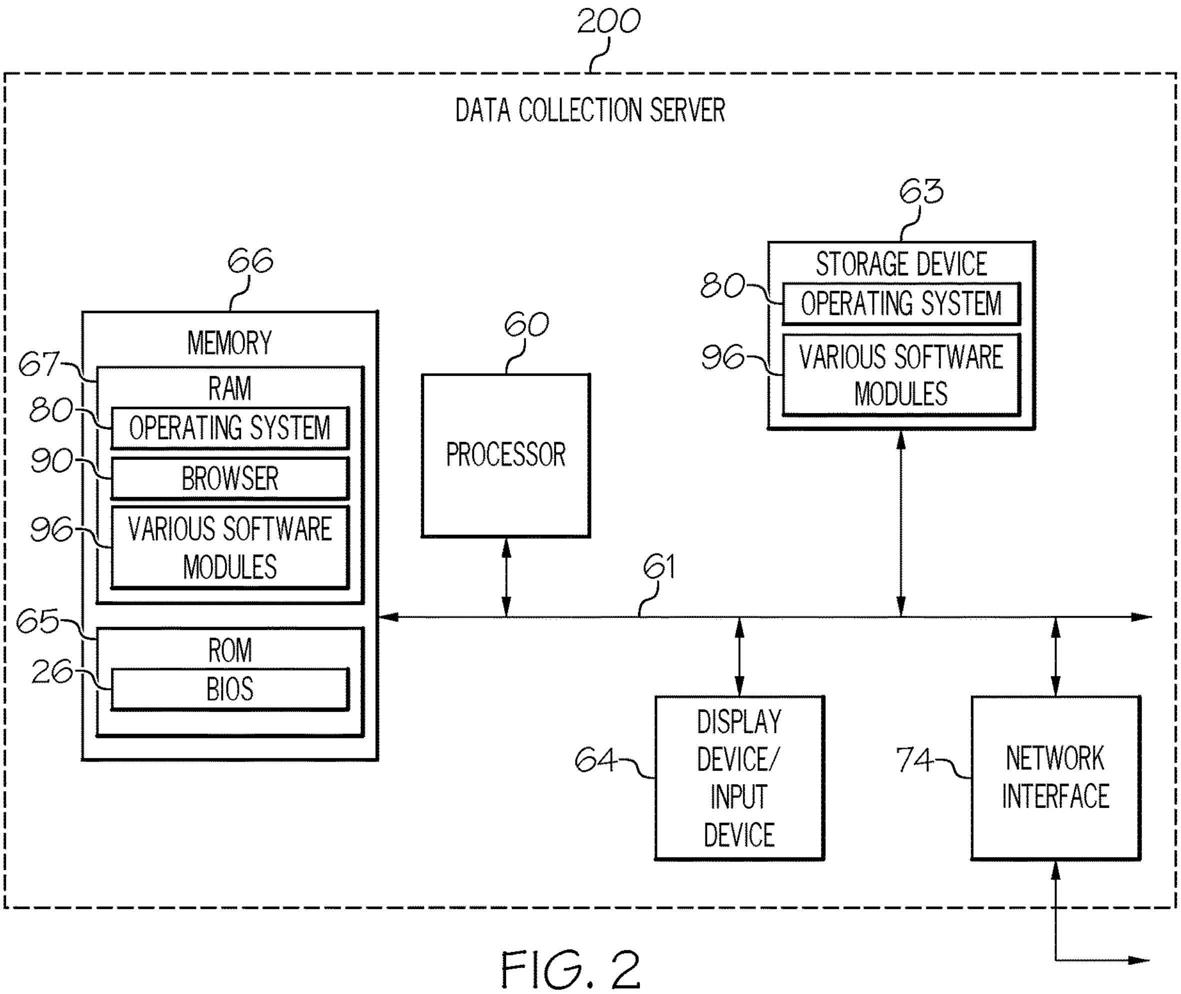
FIG. 2 is a schematic diagram of an exemplary data collection server of the hand hygiene monitoring system according to various embodiments of the present disclosure.

Turning to FIG. 2, exemplary components of data collection server 200 are shown. Data collection server 200 may include several basic computer hardware components. As may be understood from FIG. 2, in this embodiment, data collection server 200 includes a processor 60 that communicates with other elements within data collection server 200 via a system interface or bus 61. Data collection server 200 also includes a display device/input device 64 for receiving and displaying data. This display device/input device 64 may be, for example, a keyboard, voice recognition, or pointing device that is used in combination with a monitor. Data collection server 200 further includes a memory 66, which preferably includes both a read only memory (ROM) 65 and a random access memory (RAM) 67. The server's ROM 65 may be used to store a basic input/output system (BIOS) 26 that contains the basic routines that help to transfer information between elements within data collection server 200.

Also located within data collection server 200 is a network interface 74 for interfacing and communicating with other elements of a computer network (e.g., one or more networks 12). It will be appreciated by one of ordinary skill in the art that one or more components of data collection server 200 may be located geographically remote from other components of data collection server 200 and/or that certain components may be omitted from particular embodiments. Furthermore, one or more of the components may be combined, and additional components performing functions described herein may be included in data collection server 200. In various embodiments, data collection server 200 includes one or more gateways (e.g., a. ZigBee-to-Ethernet gateway) for collecting and storing data from dispenser stations (e.g., dispenser station 300).

Data collection server 200 may also include at least one storage device 63, such as a hard disk drive, a floppy disk drive, a CD Rom drive, or an optical disk drive, for storing information on various computer-readable media, such as a hard disk, a removable magnetic disk, or a CD-ROM disk. As will be appreciated by one of ordinary skill in the art, each of these storage devices 63 may be connected to the bus 61 by an appropriate interface. The storage devices 63 and their associated computer-readable media may provide nonvolatile storage for data collection server 200. It should be noted that the computer-readable media described above could be replaced by any other type of computer-readable media known in the art. Such media includes, for example, magnetic cassettes, flash memory cards, and digital video disks.

A number of program modules may be stored by the various storage devices and/or within the RAM 67. Such program modules include an operating system 80, a browser 90, and various other software modules 96. For simplicity and brevity, these modules are merely exemplary and may represent a number of program modules that control certain aspects of the operation of data collection server 200 with the assistance of the processor 60 and the operating system 80.

Data collection server 200 may be used to send instructions and/or programming to one or more other components, including dispenser station 300 and/or tag 400. In a particular embodiment, data collection server 200 broadcasts programming instructions to various dispenser stations, including specific instructions to specific dispenser stations, which may include, for example, a specific audio message to play or other specific behavior based on the specific dispenser station location or other factors discussed herein.

Dispense Station

Figure 3:
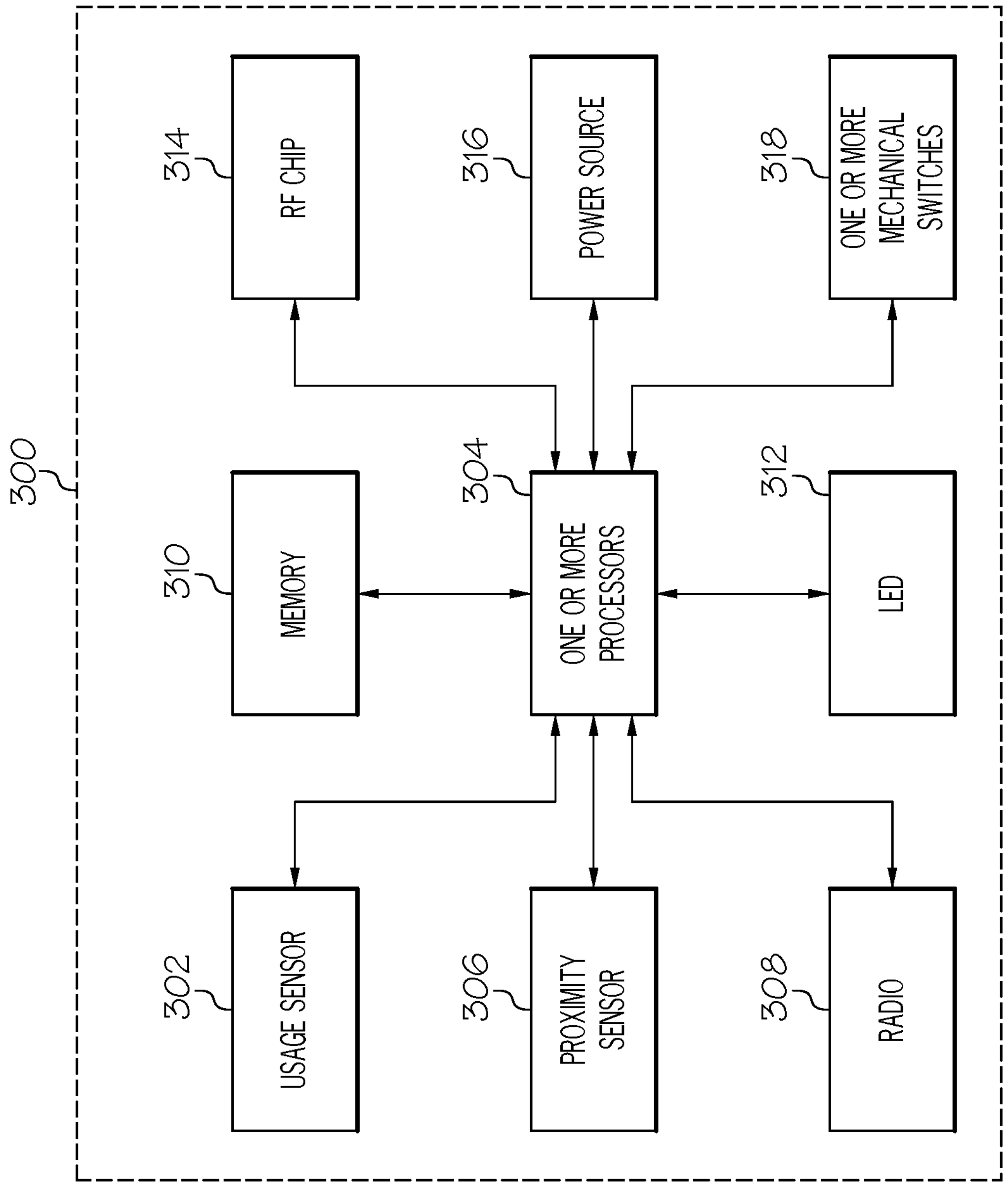
FIG. 3 is a schematic diagram of an exemplary dispenser station of the hand hygiene monitoring system according to various embodiments of the present disclosure.

FIG. 3 depicts an exemplary embodiment of a dispenser station 300 (e.g., dispenser station 300A and/or 300B) including a usage sensor 302, a proximity sensor 306, a radio 308, one or more processors 304, memory 310, an LED 312, a radio frequency chip (RF) 314, a power source 316, and one or more optional mechanical switches 318. It should be noted that these components of the dispenser station 300 are merely exemplary. Dispenser station 300 may include any number of additional components not shown and may function with any number of the components shown removed, as will be understood by one of ordinary skill in the art. It should be understood that each dispenser station 300 may be operatively connected to a mesh network (as further described herein) and may be assigned a particular unique identifier.

In various embodiments, the dispenser station 300 is operatively connected to a housing for storing an amount of hand hygiene product and a dispenser for dispensing the hand hygiene product. It should be understood that, in particular embodiments, the dispenser station 300 is operatively connected to the housing and dispenser in any suitable way. In a particular embodiment, the dispenser station is added on to an existing housing and dispenser (e.g., the housing and dispenser are attached to the dispensing station 300, the dispensing station comes in various connected components that are operatively attached to the housing and/or dispenser, etc.). In further embodiments, the dispensing station 300 includes the dispenser and housing as part of the design (e.g., the dispensing station 300 is not an add-on, but is integrated with the dispenser and housing).

It should also be understood that that dispenser station (and dispenser and housing) may include, store, and dispense any suitable type of hand hygiene solution and/or product. In various embodiments, the hand hygiene product is soap. In some embodiments, the hand hygiene product is a particular type of soap, such as anti-bacterial soap. In further embodiments, the hand hygiene product is hand sanitizer or hand antiseptic (e.g., any commonly (or uncommonly) produced gel, foam, or liquid with an anti-microorganism substance, typically alcohol).

In the embodiment shown in FIG. 3, the dispenser station 300 includes usage sensor 302, which, in various embodiments, is configured to detect one or more actions performed by a user to activate the hand hygiene product dispenser. It should be understood that the usage sensor 302 may be any suitable sensor to detect the action performed by the user to dispense the hand hygiene product. In various embodiments, the usage sensor is a mechanical sensor that detects when the lever of an existing dispenser is pulled (e.g., to dispense the hand hygiene product). In particular embodiments, the usage sensor 302 is configured to detect when the user waves or places their hand in front of a light or motion sensor to indicate they wish the dispenser to dispense the hand hygiene product. It should be understood that in embodiments where the dispenser and/or housing are an integral part of the dispenser station 300, the usage sensor 302 may be the same sensor used to detect that the user wishes the dispenser to dispense the hand hygiene product.

In the embodiment in FIG. 3, the usage sensor 302 is operatively connected to one or more processors 304. One or more processors 304, in various embodiments, complete various process steps discussed herein. It should be understood that one or more processors 304 may be any suitable one or more processors and may represent, for example, a system-on-a-chip type system that implements a Bluetooth low energy stack (e.g., Texas Instrument CC2541), which may incorporate RF chip 314 and/or radio 308.

A proximity sensor 306 is operatively connected to one or more processor 304. Proximity sensor 306 may be any suitable proximity sensor discussed herein, including, but not limited to an ultrasound sensor, laser sensor, optical/light sensor, heat sensor, radar sensor, sensor that utilizes Wi-Fi, radio waves, etc. The proximity sensor may be configured to receive an indication of a particular object within a predetermined range depending on the type of sensor (e.g., an ultra sound sensor receives sound, etc.). It should be understood that proximity sensor 306 may represent multiple sensors (e.g., multiple ultrasound sensors, etc.).

Proximity sensor 306 may be adjustable. In various embodiments, proximity sensor 306 is adjustable by a mechanical or digital switch (e.g., one or more mechanical switches 318). In one or more embodiments, proximity sensor 306 is adjustable via programming received from data communication server 200, from a website, from a web application, and/or from any other suitable source. It should be understood that proximity sensor 306 may be adjustable in any suitable way, including, but not limited to, adjustable in range (e.g., distance and width of field) and/or adjustable in direction.

One or more processors 304 are operatively connected to radio 308. Radio 308 may be any suitable radio for transmitting and/or receiving data, which may be transmitted in any suitable format. In particular embodiments, radio 308 is a radio for broadcasting and receiving radio waves, such as a ZigBee wireless communication module (e.g., Digi XBee S2). In further embodiments, radio 308 is a radio for broadcasting and receiving Wi-Fi, microwaves, Bluetooth, 3G, 4G, or any other suitable type of wireless communication. It should be understood that, in at least one embodiment, radio 308 transmits to and receives from the data collection server 200 and/or a radio of another dispenser station (e.g., dispenser station 300A communicates with dispenser station 300B via radios or RE chips operatively connected to each).

One or more processors 304 are operatively connected to memory 310. Memory 310 may be any suitable memory, including, but not limited to, flash, removable memory, RAM, etc. Memory 310, in various embodiments, stores various data collected by any of usage sensor 302 or proximity sensor 306, any communication data received from radio 308 or RF chip 314, and/or any indications from one or more optional mechanical switches 318. In a particular embodiment, memory 310 stores one or more log entries created by the one or more processors 304, to be further discussed below.

One or more processors 304 may be operatively connected to an LED 312. It should be understood from discussions herein that LED 312 is merely representative of any suitable visual signal device.

LED 312 may be used to indicate any suitable message. LED 312 turning on, blinking, turning off, or otherwise changing (e.g., changing color) may indicate, for example, that the dispenser is in use (e.g., that the dispenser is dispensing hand hygiene product), that the usage sensor 302 has detected the action for dispensing hand hygiene product (as discussed above), that the proximity sensor has detected an object, that radio 308 is receiving data, that one or more cords are plugged into the dispenser station (e.g., wherein the dispenser station communicates with a component by wire transmission), that the RF chip 314 and/or radio has received a signal from one or more tags (discussed below), that a battery (e.g., power source 316) is low, etc.

As shown in the exemplary embodiment in FIG. 3, one or more processors 304 are operatively connected to RF chip 314. In particular embodiments, RF chip 314 communicates with one or more tags (e.g., tags 400A, 400B, and/or 400C). It should be understood that RF chip 314 may communicate with one or more tags in any suitable way, including, but not limited to, via Bluetooth, low energy Bluetooth, microwaves, Wi-Fi, radio waves, sonar, etc. As discussed above, RF chip 314 may be an integral part of a system-on-a-chip type system. In one embodiment, RF chip 314 and radio 308 are the same device.

One or more processors 304 may be operatively coupled to a power source 316. As will be understood by one of ordinary skill in the art, power source 316 may be any suitable power source such as a battery and/or outlet type electrical source. It should be understood that power source 316 may be rechargeable by solar energy (via one or more solar panels not shown) and/or via kinetic energy (e.g., the system is configured to harvest energy each time a user pulls a lever to receive hand hygiene product).

In the exemplary embodiment shown in FIG. 3, dispenser station 300 may include one or more mechanical switches 318 operatively connected to one or more processors 304. One or more mechanical switches 318 may include, for example, an on/off switch for the dispenser station 300, a calibration/adjustment button/switch for proximity sensor 306, a speaker (not shown), and/or a switch to calibrate and/or adjust an audio message played and/or the speaker volume (including turning the speaker off).

It should be understood that, the dispenser station 300 may be integrated with various other systems such as a security system, a hospital MR system, a hospital census system, human resource systems, payroll systems, medical supply systems, security door databases, etc.

Tag (Identifier)

Figure 4:
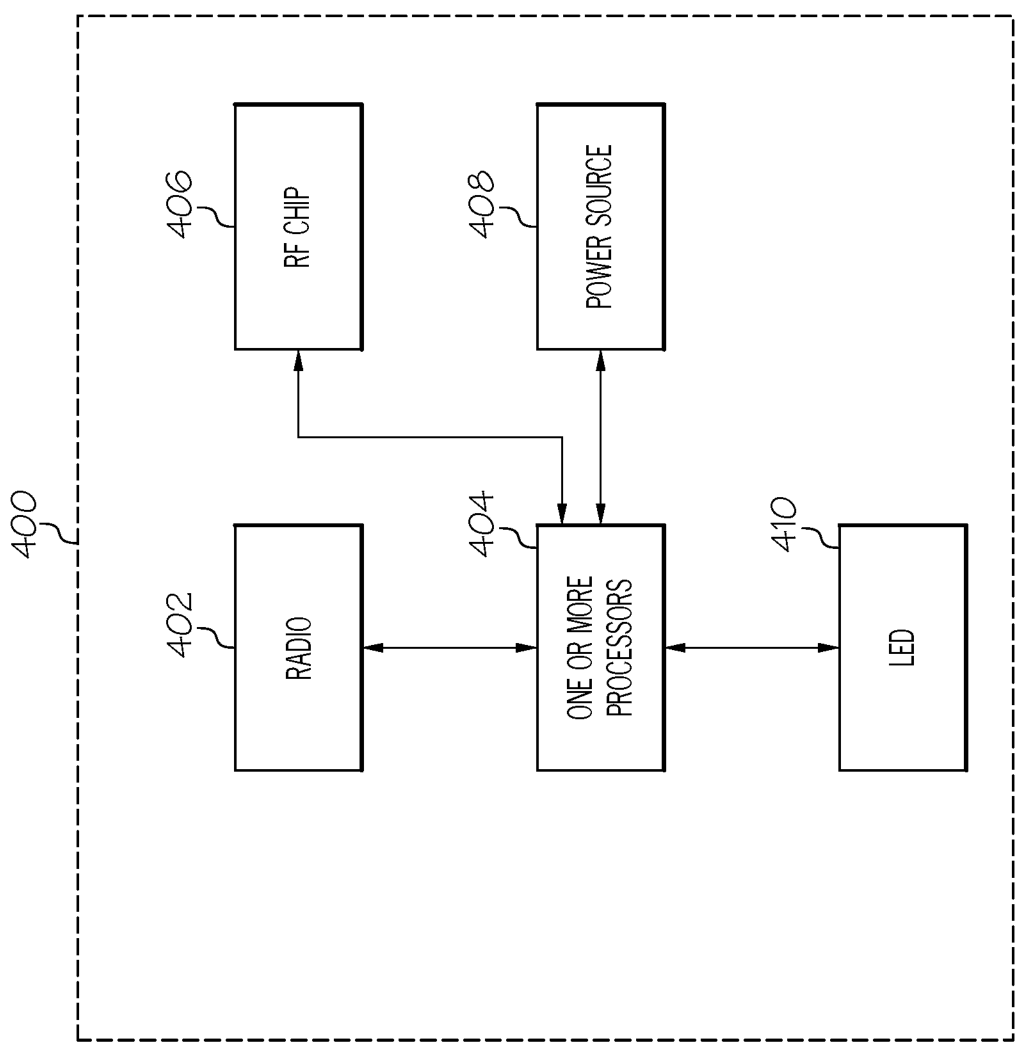
FIG. 4 is a schematic diagram of an exemplary tag (e.g., identifier) of the hand hygiene monitoring system according to various embodiments of the present disclosure.

FIG. 4 depicts an exemplary embodiment of a tag 400 (e.g., tag 400A, 400B, and/or 400C). In the exemplary embodiment shown in FIG. 4, tag 400 includes a radio 402, one or more processors 404, an RF chip 406, a power source 408, and an optional LED 410. The tag 400 may be embedded in an identification tag, embedded in an identification tag holder (e.g., to be carried by a person, but not part of an identification badge), and/or in some other portable housing (e.g., to place on a cart or other equipment). According to particular embodiments, the tag is embedded in an identification badge reel, which may include a retractable line (e.g., rope, wire, or string) that is operatively coupled to an identification card/badge and is visible outside of the borders of the identification card/badge.

Radio 402 is operatively connected to one or more processors 404. Radio 402, in various embodiments, may be any suitable radio. In at least one embodiment, radio 402 is an antenna for receiving and transmitting low power Bluetooth transmissions of packets. It should be understood from discussions herein that one or more processors 404 and RE chip 406 may be an integrated unit (e.g., a tag may not include a separate processor, only an RF chip or vice versa). According to particular embodiments, radio 402, one or more processors 404, and/or RF chip 406 operate in conjunction to receive a transmission (e.g., via radio 402) from a dispenser station (e.g., dispenser station 300) and, in response to receiving the transmission, sending a packet of information to the dispenser station, According to some embodiments, radio 402, one or more processors 404, and/or RF chip 406 operate in conjunction to send/broadcast a packet of information to the dispenser station (e.g., the system is configured to broadcast the packet automatically). In various embodiments, the packet of information includes a unique identifier (e.g., serial number, sequence of numbers and letters, etc.) used to identify the user or piece of equipment associated with the tag. Additionally, in particular embodiments, the unique identifier may identify a group or groups the user and/or piece of equipment associated with the tag is part of. As a particular example, a tag may be pre-programmed to be part of a first group, wherein each tag in the first group is pre-programmed to broadcast a unique identifier with a first number of 1.

Tag 400 may be powered by any suitable power source 408. In various embodiments, power source 408 may be, for example a 3V coin-cell battery. In particular embodiments, power source 408 may be rechargeable via solar (via a small solar panel), kinetic (movement of a badge reel, movement of a user carrying tag 400, etc.), or any other suitable type of energy.

Tag 400 may include an LED 410 and/or any other suitable input/output component. In various embodiments, tag 400 may be configured to indicate a low battery status or other suitable indication via LED 410 and/or any other suitable input/output component (e.g., the tag may be configured to indicate low battery by audio message, by vibration in embodiments including a motor, wirelessly to other portions of the system, wirelessly to other systems, etc.).

Exemplary System Operation

Figure 6:
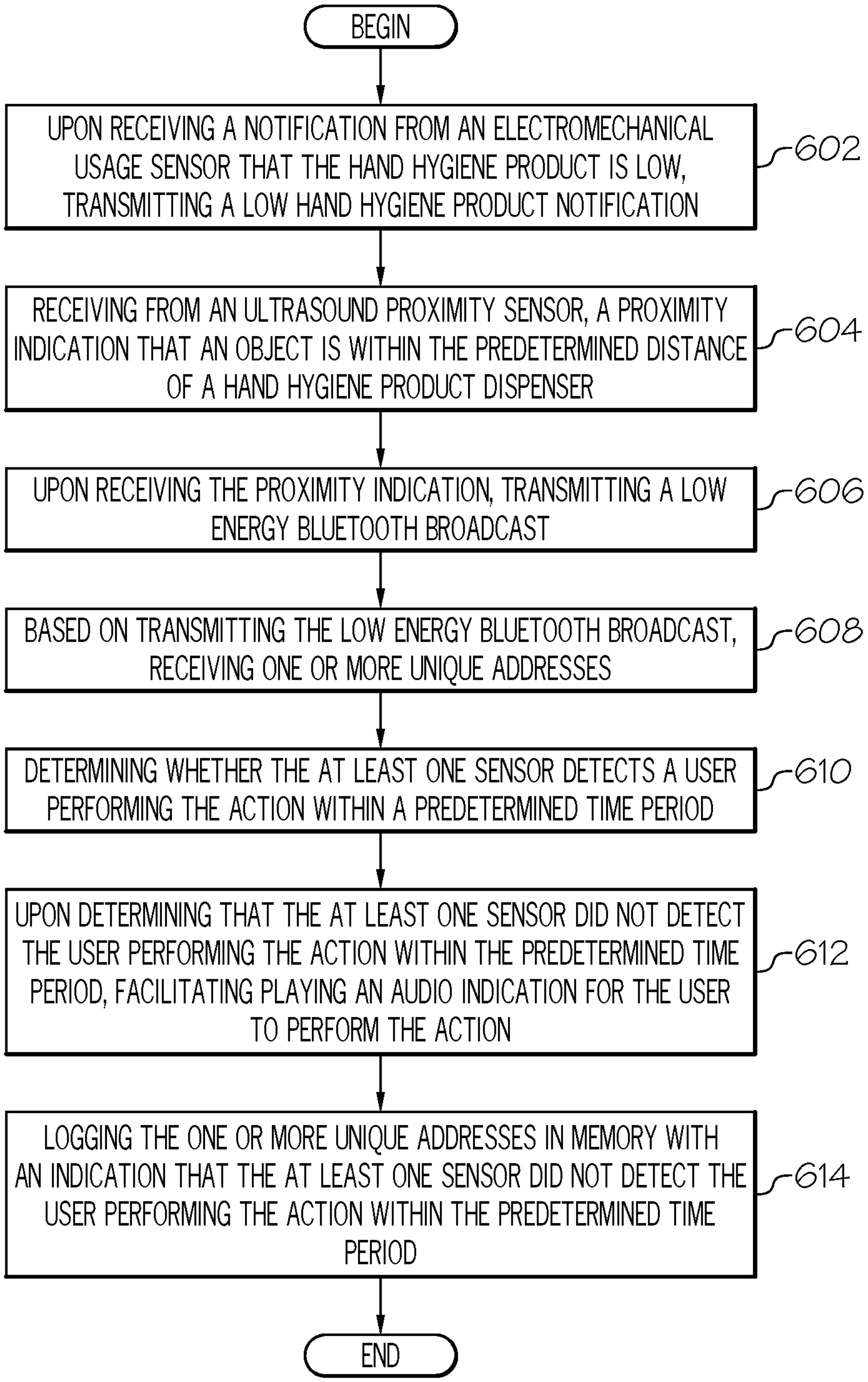
FIG. 6 is a flowchart of an exemplary process of the hand hygiene monitoring system according to various embodiments of the present disclosure.
Figure 7:
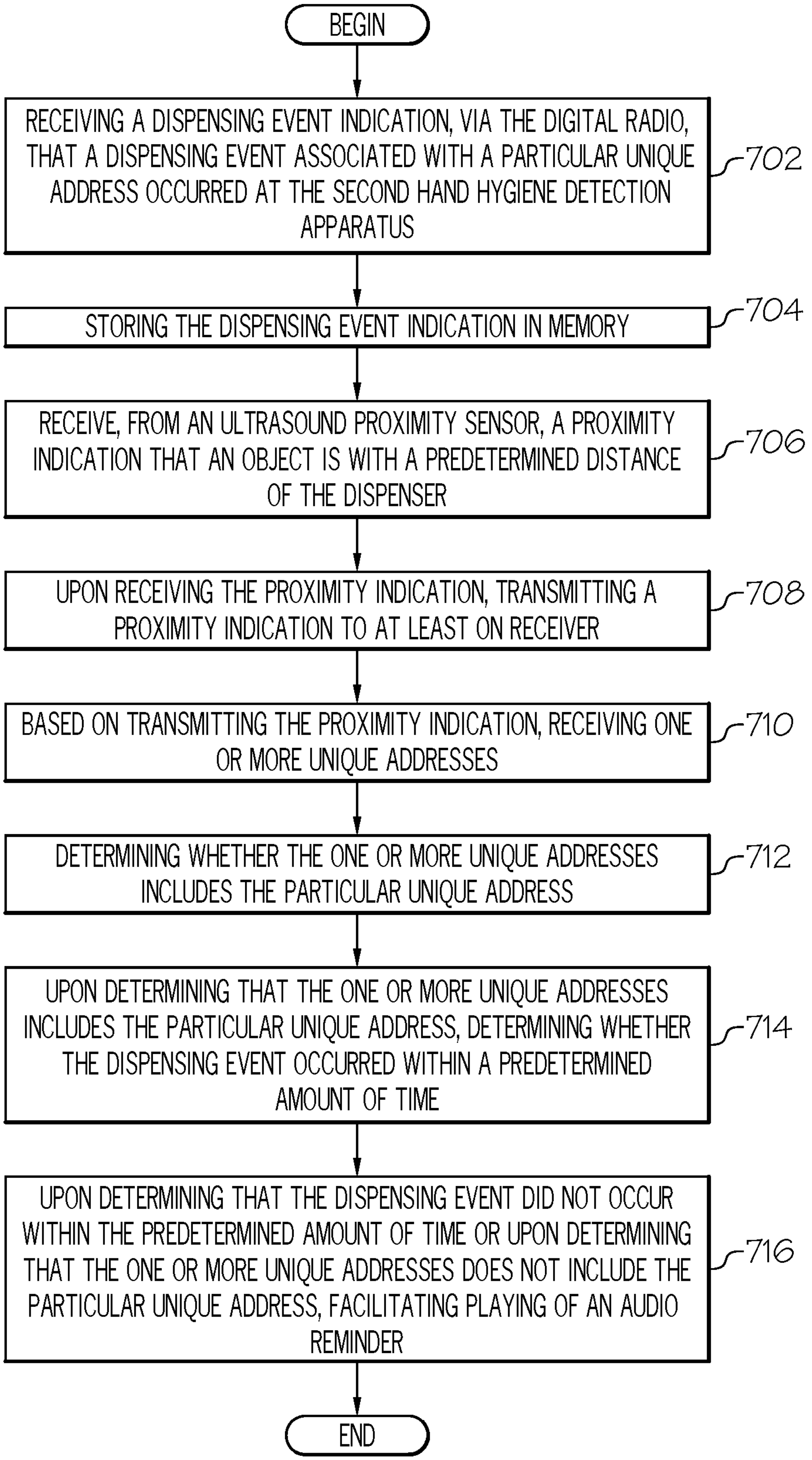
FIG. 7 is a flowchart of an exemplary process of the hand hygiene monitoring system according to various embodiments of the present disclosure.

The hand hygiene system described herein may perform any number of functions and processes. Various embodiments of these functions and processes are depicted in FIGS. 5, 6, and 7.

Dispenser Station Exemplary Functionality

Figure 5:
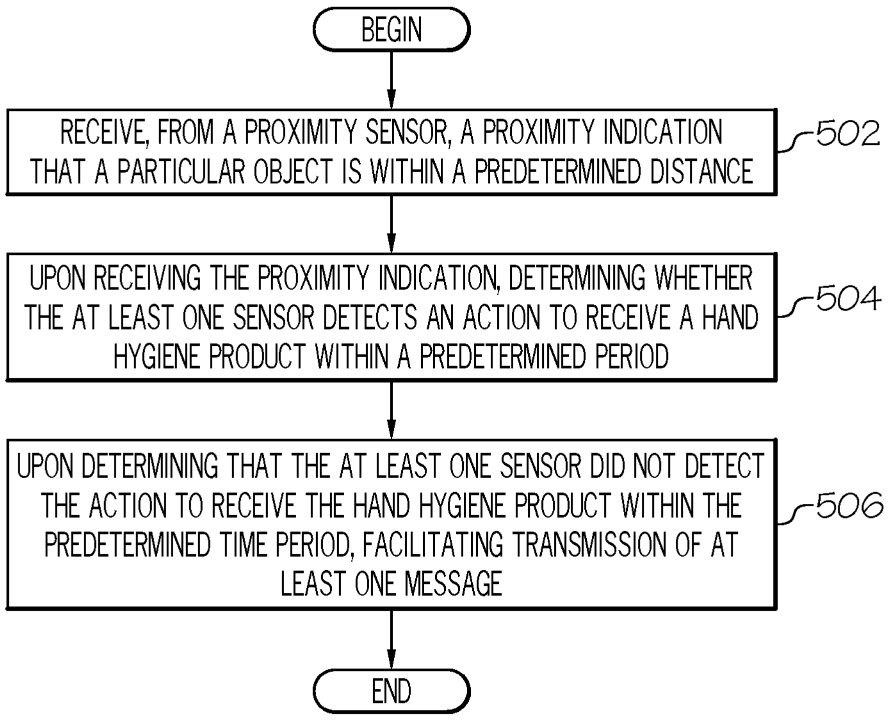
FIG. 5 is a flowchart of an exemplary process of the hand hygiene monitoring system according to various embodiments of the present disclosure.

Beginning with FIG. 5, the system begins at step 502 by receiving, from a proximity sensor, a proximity indication that a particular object is within a predetermined distance. In various embodiments, the predetermined distance is preprogrammed as part of programming of the system. In particular embodiments, the predetermined distance is adjustable remotely and/or via a mechanical switch (e.g., a user may physically adjust the predetermined distance via a nob, lever, or other mechanical device that is operatively connected an input of the at least one processor). In further embodiments, the system is configured to substantially automatically adjust the predetermined distance based on any number of parameters, including (but not limited to) various conditions (day verses night, etc.), environment (busy verses not busy times of day, different areas of a hospital, etc.), objects the system is configured to detect (e.g., people wearing tags verses tagged equipment, such as carts, etc.). It should be understood by one of ordinary skill in the art that the predetermined distance may change based on the direction of the proximity sensor (e.g., the predetermined distance may change if the proximity sensor is pointed perpendicular to the face of a hand hygiene product dispenser opposed to at 45 degrees from the face of a hand sanitizer product dispenser).

The particular object may be any suitable object. In various embodiments, the particular object is a person (e.g., doctor, nurse, janitor, guest, etc.). In some embodiments, the particular object is an inanimate object, such as a cart for supplies, etc. It should be understood from discussions herein, that in various embodiments, the proximity sensor can detect any object within a predetermined distance (field or range) regardless of whether the object has a tag (as discussed here).

It will be understood by one of ordinary skill in the art that the predetermined distance may be any suitable distance. In various embodiments, the predetermined distance is about one to three feet from a hand hygiene dispenser. In particular embodiments, the predetermined distance is about one inch to ten feet from a hand hygiene dispenser.

At step 504, the system, upon receiving the proximity indication, determines whether the at least one sensor detects an action to receive a hand hygiene product within a predetermined time period. In various embodiments, the system is configured, upon receiving the proximity indication, to start a "clock" that counts down for the predetermined amount of time. In these (and other) embodiments, the system is configured to determine whether the at least one sensor detects the action before the end of the predetermined amount of time. It should be understood that the predetermined time period may be any suitable time period, including, but not limited to about one second, about two seconds, about one to five seconds, about ten seconds, less than half a second, etc.

A step 506, the system, upon determining that the at least one sensor did not detect the action to receive the hand hygiene product within the predetermined time period, facilitates transmission of at least one message. In various embodiments, the system is configured to facilitate transmission of the at least one message by playing an audio message (as described herein) through one or more speakers. In particular embodiments, the system is configured to facilitate transmission of the at least one message via a non-audio indication such as a visual (light) indication and/or via a message sent to a tag that plays a message (via a speaker), vibrates, or provides a visual indication.

FIG. 6 depicts another exemplary embodiment of the present systems and methods. Beginning with step 602, the system, upon receiving a notification from an electromechanical usage sensor that the hand hygiene product is low, transmits a low hand hygiene product notification. As discussed herein, the system may be configured to transmit any suitable low hand hygiene product notification including an audio reminder, a visual reminder, etc.

At step 604, the system receives, from an ultrasound proximity sensor, a proximity indication that an object is within a predetermined distance of the sensor and at step 606, the system, upon receiving the proximity indication, transmitting a low energy Bluetooth broadcast. In various embodiments, the system is configured to transmit the low energy Bluetooth broadcast within a predetermined range (e.g., a range corresponding to the predetermined distance of the hand hygiene product dispenser above). In particular embodiments, the system is configured to transmit the low energy Bluetooth broadcast to one or more tags (as discussed herein).

At step 608, the system, based on transmitting the low energy Bluetooth broadcast, receives one or more unique addresses. In various embodiments, the system is configured to receive the one or more unique addresses as part of a packet received from one or more tags. At step 610, the system determines whether the at least one sensor detects a user performing the action within a predetermined time period. The predetermined time period may be any suitable time period, such as about one second, about one-tenth of a second to about three seconds, less than five seconds, etc. In various embodiment, the predetermined time period may be one or more processes.

At step 612, the system, upon determining that the at least one sensor did not detect the user performing the action within the predetermined time period, facilitates playing an audio indication (e.g., reminder) for the user to perform the action. As discussed herein, the system may be configured to play (or transmit) any suitable indication and/or reminder. Also, as discussed herein, the indication and/or reminder may change based on a variety of factors, such as the one or more received unique identifiers (e.g., at step 608), time of day, etc. At step 614, the system logs the one or more unique addresses in memory with an indication that the at least one sensor did not detect the user performing the action within the predetermined time period.

Mesh Network Hand Hygiene Detection Process (Multi-Sensor)

FIG. 7 depicts a high-level flow chart of an exemplary process of the systems and methods described herein. Beginning at step 702, the system, at a first hand hygiene detection apparatus, receives a dispensing event indication, via a digital radio, that a dispensing event associated with a particular unique address occurred at a second hand hygiene detection apparatus. In various embodiments, the first and second hand hygiene detection apparatuses are in operative communication via digital radios as shown and discussed in relation to FIG. 2. At step 704, the system stores the dispensing event indication in memory.

At step 706, the system receives, at the first hand hygiene detection apparatus, from an ultrasound proximity sensor, a proximity indication that an object is within a predetermined distance of the dispenser. At step 708, the system, upon receiving the proximity indication, transmits a proximity indication to at least one receiver. At step 710, the system, based on transmitting the proximity indication, receives one or more unique addresses.

At step 712, the system, determines whether the one or more unique addresses include the particular unique address. In various embodiments, the system is configured to determine whether the one or more unique addresses include the particular address in any suitable way. At step 714, the system, upon determining that the one or more unique addresses include the particular unique address, determines whether the dispensing event occurred within a predetermined amount of time. At step 716, the system, upon determining that the dispensing event did not occur within the predetermined amount of time or upon determining that the one or more unique addresses does not include the particular unique address, facilitates playing of an audio reminder.

It should be understood that the system may be configured to log and store any and/or all events that occur. In various embodiments, the system is configured to log each proximity event and each time the usage sensor indicates that the dispenser is dispensing hand hygiene product. It should be understood that this logging and collection of data may produce data and intelligence regarding how and when hand hygiene products are used and who (according to unique identifier) uses hand hygiene products.

Exemplary Environment

Figure 8:
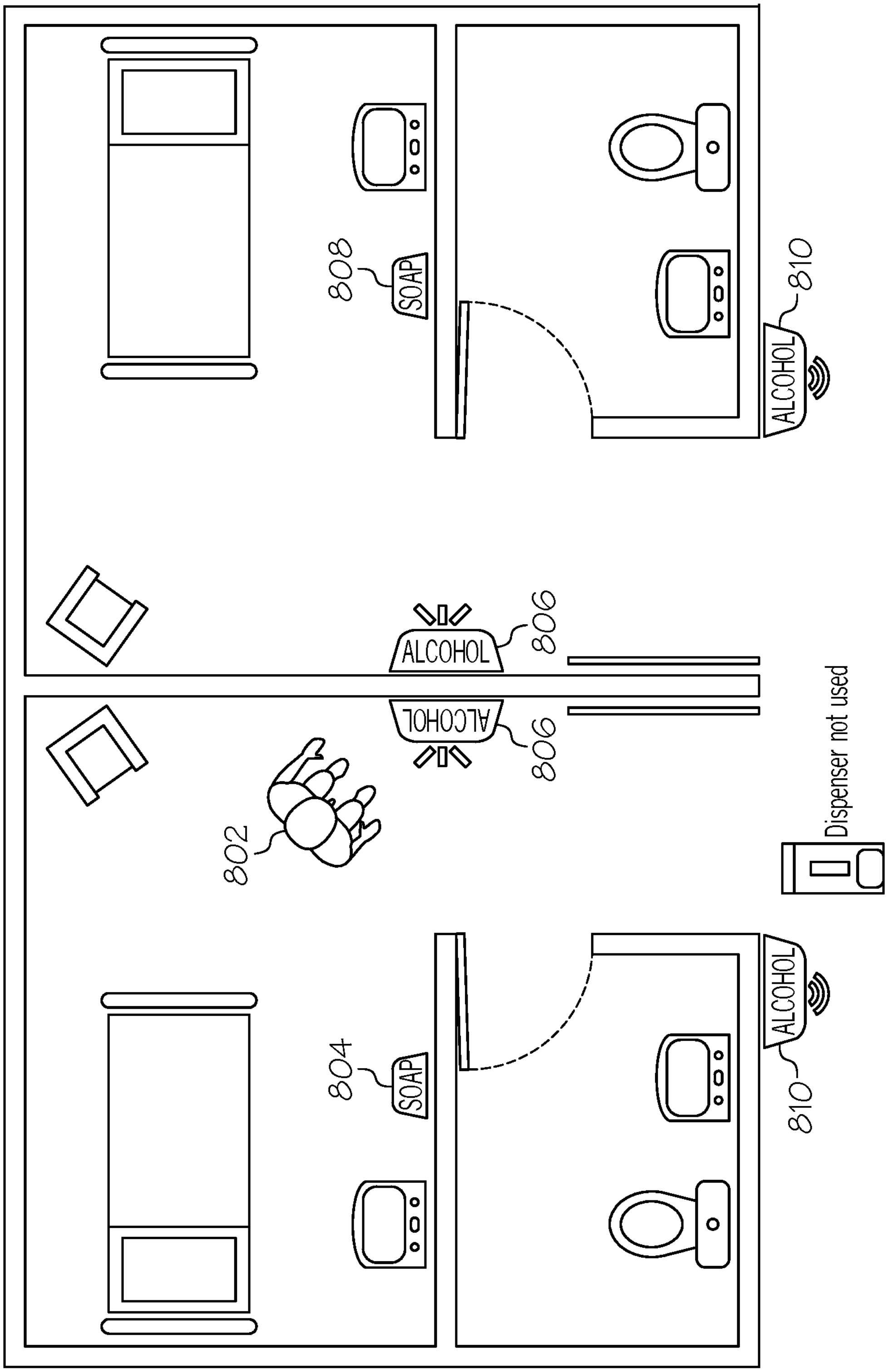
FIG. 8 is a diagram of an exemplary hand hygiene monitoring system layout according to various embodiments of the present disclosure.

As discussed above, various aspects of the present systems and methods relate to identifying an individual across multiple dispenser stations. FIG. 8 shows an exemplary system environment where with an exemplary individual 802 and six exemplary networked dispenser stations 804-812 in operative communication.

As shown in this exemplary embodiment, dispenser stations 804 and 808 are "SOAP" stations (e.g., dispenser stations for dispensing soap as a hand hygiene product) and dispenser stations 806, 810, and 812 are "ALCOHOL" stations 30 (e.g., dispenser stations for dispensing an alcohol-based hand hygiene product).

In the embodiment shown, dispenser station 810 detected individual 802 go past the dispenser via one or more proximity sensors without using the hand hygiene product (e.g., the individual 802 did not perform the action to dispense the hand hygiene product). Dispenser station 810 sends, via one or more radios, an indication that individual 802 walked past dispenser station 810 without using the hand sanitizer. Upon receiving this indication, dispenser station 806 plays an audio message reminding individual 802 to use the hand hygiene product.

It should be understood from FIG. 8 and various discussions herein that the system may be configured to identify the range between an individual and a dispenser station, therefore detecting when an individual enters or exits a patient's room.

In various embodiments where more than one dispenser station is networked (e.g., as shown in FIG. 8), the system may coordinate between multiple dispenser stations placed in various locations (e.g., throughout a hospital). One example, would be communication between a dispenser station inside and a dispenser station outside a patient's room to allow a provider to use either the sanitizer inside or outside the room and still receive credit for a successful patient interaction (e.g., the system logs that the individual used the dispenser station according to protocol).

Alternate Embodiments

Alternative embodiments of the system may include features that are, in some respects, similar to the various components described above. Selected distinguishing features of these alternative embodiments are discussed below.

Usage Sensor

The system may be configured, via one or more processors 304, in operation with usage sensor 302, to determine when a housing (e.g., a housing storing hand hygiene product) has reached a certain amount of hand hygiene product (e.g., when a dispenser station is low on hand hygiene product) by receiving and counting a number of actions performed by various users to dispense the hand hygiene product. In various embodiments, the dispenser may be configured to dispense a predetermined amount of hand hygiene product each time the action is performed (e.g., each time a person pumps the dispenser, a predetermined amount of hand hygiene product is dispensed). In these (and other embodiments), one or more processors 304 may be configured to compare the number of actions performed to a stored predetermined number of actions that indicates the housing is low on hand hygiene product. For example, each time the action is performed (e.g., the dispenser is pumped), the dispenser dispenses about 0.5 oz. of hand hygiene product. Continuing with this example, if the housing stores about 20 oz. of hand hygiene product, the system may be configured to indicate that the housing is low on hand hygiene after one or more processors 304 determine that 35 actions have occurred (e.g., 35 pumps of the dispenser times about 0.5 oz. equals about 17.5 oz. of hand hygiene product used and about 2.5 oz. of hand hygiene product stored in the housing).

One or more processors 304 may be configured to receive communications through usage sensor 302 based on the type, pattern, and/or number of actions performed. In various embodiments, one or more processors 304 are programmed to receive an action and/or pattern of actions from usage sensor 302. In particular embodiments, one or more processors 304 are configured to receive a pattern of actions and determine that the sanitizer is running out, that an error state has occurred, etc. The pattern or type of action may be any suitable pattern or type of action, such as, for example, performing the action for an extended period of time (e.g., pulling the pump lever for an extended period of time), performing the action a number of times in rapid succession, performing a different action (e.g., pulling a pump lever in the opposite direction), etc. These communications may be relayed through the system to the data communication server or to any other suitable system and/or location.

Messages

Various embodiments of systems and methods discussed herein include playing of an audio type message to remind a user to use hand sanitizer product. In a number of embodiments, these systems may be configured to play a voice reminder. In some of these embodiments, the system may be configured to play multiple voices (e.g., depending on the environment, time of day, unique identifier received from a tag, etc.), to play multiple voices at random (for variation), to play a different voice based on whether the system received a unique identifier (e.g., whether the system was sent a packet including a unique identifier from a tag indicating an employee), to play a multiple voices based on the type of unique identifier received (e.g., a unique identifier associated with a nurse prompts the system to play a particular voice and/or message and a unique identifier associated with a janitor prompts the system to play a different particular voice and/or message), and/or to play messages in more than one language.

In various embodiments, the system may be configured to enable users to select, modify, and/or record messages (e.g., a patient in a hospital room may record their own message). The system may be configured to enable a user to select, modify, and/or record message in any suitable way, such as (but not limited to) via a website, an application (e.g., an application on a mobile device), and/or at a dispenser station (e.g., via a microphone or mechanical or digital selection switches).

It should be understood by one of ordinary skill in the art that the system may be configured to enable a user to program and/or re-programming one or more messages by data communication server 200 (e.g., and sending the new or re-programmed message to a particular dispenser station), by programming or re-programming a particular dispenser station by interfacing directly with the particular dispenser station, by a website and/or web application, etc.

The system may be configured for dynamic control of audio messages, dynamic control of different messages, and/or dynamic control of non-audio messages (e.g., a dispenser station may be configured to transmit a non-audio message, such as a visual indicator in various embodiments). In one or more embodiments, the system is configured to enable dynamic volume control and/or switch to a visual indicator (e.g., under certain conditions it may be desirable to switch off the sound and have a visual hand hygiene product use reminder).

In various embodiments, the system may be configured to dynamically change a message, volume level of a message, etc. based at least in part on location, time of day, patient type, background noise level, presence of certain patients, light in room, patient control, environment, dynamic compliance information, etc. In one or more embodiments, the system may be configured to dynamically change a message, volume level of a message, etc. at least partially based on status of the system, such as low battery, low hand hygiene product, etc., In further embodiments, the system is configured to dynamically change a message, volume level of a message, etc. based at least in part on a facility wide message (e.g., a hospital wide message, such as weather, fire, other emergency notifications, etc.), a particular season (holiday and/or season based messages), time of day, etc. In a particular example, in the event of an emergency, an emergency message may play via one or more dispenser stations (as well as, or in place of, a traditional intercom or notification system).

Proximity Sensor

In various embodiments, the system may be configured to determine more than one object within range of proximity sensor 306, identify multiple objects within range, and/or identify and distinguish one or more tags within range. In some of these embodiments, one or more processors 304 are configured to determine a distance from proximity sensor 306 based at least in part on proximity sensor range, strength of a received transmission (e.g., received signal strength indicator (RSSI)), battery strength of the transmitting signal, class behavior rules, number of packets received, amount of a packet received (e.g., in various embodiments, when a tag is in range, it transmits a packet and the system may be configured to determine how far away from the proximity sensor the tag is by how much of the packet is received or how many times the packet is received), combination of RSSI and battery, etc.

In particular embodiments, the system is configured to identify an object near a proximity sensor and one or more objects in other areas of room based on any of the techniques described herein. In one or more embodiments, the system is configured to use multiple sensors (e.g., sensors from a particular dispenser station and/or sensors from multiple dispenser stations) to determine a network, to track tags through a facility, etc.

Tag

In various embodiments, tag 400 may be configured to indicate low battery status by visual (e.g., LED 410), audio (via a speaker not shown), or wireless transmission. In one or more embodiments, the system may be configured to dynamically modify packets broadcast by a tag (e.g., tag 400) by communication from data communication server 200 or in any other suitable way. In at least one embodiment, tag 400 is configured to be recognized in multiple environments (e.g., a physician can wear the same tag in various hospitals based on permissions of the system or systems) and/or tag 400 is configured to restrict access in various locations (e.g., a warning message is played via tag 400 and/or dispenser station 300 when tag 400 enters an unauthorized area/facility).

In further embodiments, the system may be configured to use a mobile device running software and/or hardware as a tag performing similar functionality to tag 400. In still further embodiments, tag 400 may be integrated with various other systems such as a security system, a hospital EHR system, a hospital census system, human resource systems, payroll systems, medical supply systems (e.g., in embodiments where tag 400 is operatively connected to equipment), security door databases (e.g., such that tag 400, acts as a security badge).

In particular embodiments the system may be configured to kill and/or disable tag 400, According to one embodiment the system is configured to detect or receive an indication of a tag low battery and/or otherwise undesirable tag (terminated employee, etc.) and, in response, the tag may be programmed to turn on LED 410 to drain a battery (e.g., power source 408), to destruct via firmware, and/or via a specialized destruction circuit built into the tag.

Mesh Network

It should be understood from discussions herein that, in various embodiments, a number of dispenser stations, tags, and/or data communication server(s) wirelessly connected may form a mesh network (which, in some embodiments, may be self-healing). In at least one embodiment, each dispenser station has an associated unique identifier and/or location identifier. In this (and other) embodiment(s), the system may be configured to send programming instructions via the mesh network to each device; the programming instructions dependent upon the location identifier. The system, in various embodiments, may enable a user to swap a device with a particular unique identifier for a device with a different particular unique identifier at a specific location associated with a location identifier. In this particular (and other) embodiment(s) the system sends programming instructions to the device with the different particular unique identifier based on the location identifier, thus automatically re-configuring the network with the new device (the device with the different particular identifier.

The system may, in various embodiments, be configured to map and assign device roles, programming, and identifiers based on adjacent devices. In particular embodiments, a mesh network of dispenser stations may be further broken down into small sub-networks (e.g., for a particular room, hallway, etc.) with unique programming attributes (e.g., no audio messages, etc.)

In various embodiments, a mesh network may allow for communication between several dispenser stations that are places strategically around a patient's room. In at least one embodiment, the system is configured for communication between stations through the wireless network between rooms that were not adjacent. In these embodiments (and others), existing data communication networks may be leveraged for wireless data transmission among dispenser stations. As discussed herein, the system, in various embodiments, is configured to determine when a provider entered or exited a patient's room. In some embodiments, the system may use information regarding when a provider entered or exited a patient's room to change the behavior, timings, or messages that are relayed to the provider. For example, a dispenser station located inside a room may be configured to play an audio recording when a provider entered the room or a dispensing station located outside the room may be configured to play a recording only when the provider exited the room.

According to particular embodiments, the system is configured, via one or more mesh networks of dispenser stations, for continuous monitoring and transmission of data among dispenser stations. In these embodiments, and others, a continuous mesh network would also enable transmission of the compliance information to a centralized location for aggregation and analysis. In various embodiments, the mesh network may relay information related to battery life and/or the amount of hand hygiene product stored at a dispenser station.

In particular embodiments, the system is configured to determine an amount of time an individual spends at a location (e.g., how long a provider stays in a particular patient's room, etc.) by identifying the individual (via the tag) and identifying which dispenser stations communication with the individual's tag over a period of time. In various embodiments, the system is configured to track and locate any equipment carrying a tag that passes by one or more dispenser stations (e.g., the last location of a particular tagged piece of equipment could be determined by the last dispenser station the particular tagged piece of equipment communicated with). In at least one embodiment, the system is configured for real-time monitoring of equipment and real-time monitoring of a status and/or attributes of the device. For example tags could transmit to dispenser stations data, battery life, or other information relevant to the function of the device.

Alternate System Operations

A system for collecting data comprising: at least one processor configured for: receiving a proximity indication that a particular user is within a predefined distance of a first hand hygiene detection apparatus; in response to receiving the proximity indication, determining whether the first hand hygiene detection apparatus was used within a predetermined time, the predetermined time; in response to determining that the first hand hygiene detection apparatus was used within the predetermined time, creating a data entry corresponding the particular user and indicating that that the dispenser was used within the predetermined time; in response to creating the data entry, transmitting the data entry to a hand hygiene detection apparatus wirelessly connected to the first hand hygiene detection apparatus within a predetermined amount of time.

A system for tracking usage of a hand hygiene device comprising: an action sensor for detecting when a user performs an action to receive a hand hygiene product; an electromechanical usage sensor for detecting when the hand hygiene product is low; an ultrasound proximity sensor configured to detect an object within a predetermined distance from a hand hygiene dispenser; a radio configured to a) scan for one or more radio frequency tags within the predetermined distance and b) receive indications that one or more unique identifiers are within the predetermined distance; at least one speaker for transmitting an audio message; and one or more processors operatively connected to the action sensor, the electromechanical sensor, the ultrasound proximity sensor, the radio, and the speaker, wherein the one or more processors are configured for: a) receiving information from each of the sensors and determining whether a particular identifier of the one or more unique identifiers are within the predetermined distance and whether the action sensor detects the action to receive the hand hygiene product within a predetermined amount of time; and b) in response to determining that the particular identifier is within the predetermined distance and the action sensor does not detect the action to receive the hand hygiene product, facilitating playing the audio message via the at least one speaker.

A computer-implemented method for tracking and improving hand hygiene comprising: providing: 1) at least one sensor for detecting when an action is performed to receive a hand hygiene product; and 2) at least one processor operatively coupled to the at least one sensor; receiving, by the at least one processor, from a proximity sensor, a proximity indication that an object is within a predetermined distance of the ultrasound proximity sensor or a hand hygiene product dispenser; upon receiving the proximity indication: determining, at the least one processor, whether the at least one sensor detects the action to receive the hand hygiene product within a predetermined time period; and upon determining that the at least one sensor did not detect the action to receive the hand hygiene product within the predetermined time period, producing, by the at least one processor, an indication that the action was not detected.

The above computer-implemented method, wherein the method further comprises providing a usage sensor for detecting an amount of the hand hygiene product stored in a housing coupled to the hand hygiene dispenser, the usage sensor operatively coupled to the at least one processor. The above computer-implemented method, wherein the usage sensor is an electromechanical sensor. The above computer-implemented method, wherein the electromechanical sensor comprises a sensor for detecting the weight of hand hygiene product stored in the housing. The above computer-implemented method, wherein the method further comprises, upon receiving a notification from usage sensor that the hand hygiene product is low, transmitting, by the at least one processor, a low hand hygiene product notification.

The above computer-implemented method, wherein: the method further comprises providing at least one light coupled to the dispenser and operatively connected to the at least one processor; and transmitting the low hand hygiene product notification comprises indicating, via the at least one processor, low hand hygiene product via the at least one light. The above computer-implemented method, wherein the method further comprises activating, by the at least one processor, the dispenser to dispense a portion of the hand hygiene product stored in the housing upon receiving an indication from the at least one sensor of the action. The above computer-implemented method, wherein the proximity sensor is an ultrasound proximity sensor. The above computer-implemented method, wherein the ultrasound proximity sensor comprises an adjustable range.

The above computer-implemented method, wherein the ultrasound proximity sensor is adjustable via a mechanical adjuster mounted on the dispenser and operatively coupled to the at least one processor. The above computer-implemented method, wherein the proximity sensor is a laser scanner. The above computer-implemented method, wherein the method further comprises, upon receiving the proximity indication: transmitting, by the at least one processor, a low energy Bluetooth notification; and based at least in part on transmitting the low energy Bluetooth notification, receiving, by the at least one processor, one or more unique addresses.

The above computer-implemented method, wherein the method further comprises, upon determining that the at least one sensor did not detect the user performing the action within the predetermined time period, logging, by the at least one processor, the one or more unique address in memory with an indication that the at least one sensor did not detect the user performing the action within the predetermined time period. The above computer-implemented method, wherein the method further comprises providing at least one tag comprising an RE chip operatively coupled to an antenna, wherein: the antenna is configured to receive the low energy Bluetooth notification; and the RF chip is configured to facilitate transmitting, via the antenna, the one or more unique addresses.

The above computer-implemented method, wherein the method further comprises providing a plurality of communicably connected dispensers and wherein the dispenser is a particular dispenser of the plurality of dispensers. The above computer-implemented method, wherein the particular dispenser further comprises radio operatively connected to the at least one processor configured to receive information from the at least one other dispenser of the plurality of dispensers. The above computer-implemented method, wherein the at least one processor is configured to receive programming information via radio. The above computer-implemented method, wherein the radio is a low power digital radio.

A system for tracking and improving hand hygiene comprising: at least one sensor for detecting when a user performs an action to receive a hand hygiene product, the at least one sensor operatively coupled to at least one processor; an electromechanical usage sensor for detecting when the hand hygiene product is low, the electromechanical usage sensor operatively coupled to the at least one processor; memory operatively coupled to the at least one processor, wherein the at least one processor is operatively configured to: upon receiving a notification from the electromechanical usage sensor that the hand hygiene product is low, transmitting a low hand hygiene product notification; receive, from an ultrasound proximity sensor, a proximity indication that an object is within a predetermined distance of the ultrasound proximity sensor; upon receiving the proximity indication: transmitting a low energy Bluetooth broadcast; based on transmitting the low energy Bluetooth broadcast, receiving one or more unique addresses; determining whether the at least one sensor detects a user performing the action within a predetermined time period; and upon determining that the at least one sensor did not detect the user performing the action within the predetermined time period: facilitating playing an audio indication for the user to perform the action; and logging the one or more unique address in memory with an indication that the at least one sensor did not detect the user performing the action within the predetermined time period.

The system above further comprising a tag, the tag comprising at least one processor configured for: a) receiving the low energy Bluetooth broadcast; and b) transmitting the one or more unique addresses. The system above, wherein the tag is a wearable tag operatively coupled to an identification badge. The system above, wherein the tag comprises an RF chip, an antenna, and a battery. The system above, wherein the at least one processor is further configured to, upon facilitating playing the audio indication for the user to perform the action, determining whether the action is performed during a second predetermined time period.

The system above, wherein the at least one processor is further configured to, upon determining that the action was not performed during the second predetermined time period, logging the one or more unique address in memory with an indication that the at least one sensor did not detect the user performing the action within the second predetermined time period. The system above, wherein the electromechanical sensor comprises a sensor for detecting the weight of hand hygiene product stored in the housing. The system above, wherein: the system further comprises at least one light coupled to the dispenser and operatively connected to the at least one processor; and transmitting the low hand hygiene product notification comprises indicating low hand hygiene product via the at least one light.

The system above, wherein the at least one processor is further configured to, upon receiving the indication from the at least one sensor of the action: activate the dispenser to dispense a portion of the hand hygiene product stored in the housing; and create and store in memory a record of activating the dispenser to dispense the portion of the hand hygiene product. The system above, wherein the ultrasound proximity sensor comprises an adjustable range. The system above, wherein the ultrasound proximity sensor is adjustable via a mechanical adjuster mounted on the dispenser and operatively coupled to the at least one processor.

The system above, wherein the system further comprises at least one tag comprising an RF chip operatively coupled to an antenna, wherein: the antenna is configured to receive the low energy Bluetooth notification; and the RF chip is configured to facilitate transmitting, via the antenna, the one or more unique addresses. The system above, wherein the system comprises a plurality of communicably connected dispensers and wherein the dispenser is a particular dispenser of the plurality of dispensers. The system above, wherein the particular dispenser further comprises radio operatively connected to the at least one processor configured to receive information from the at least one other dispenser of the plurality of dispensers. The system above, wherein the at least one processor is configured to receive programming information via radio. The system above wherein the radio is a low power digital radio.

A system for tracking and improving hand hygiene comprising: at least one sensor for detecting an action to receive an hand hygiene product, the at least one sensor operatively coupled to at least one processor; and memory operatively coupled to the at least one processor, wherein the at least one processor is operatively configured to: receive, from an ultrasound proximity sensor, a proximity indication that an object is within a predetermined distance of the ultrasound proximity sensor or the hand hygiene product dispenser;

upon receiving the proximity indication: transmitting a low energy Bluetooth notification to at least one tag via a radio; based on transmitting the low energy Bluetooth broadcast, receiving, via the radio, one or more unique addresses from the at least one tag; determining whether the at least one sensor detects the action within a predetermined time period; and upon determining that the at least one sensor did not detect the action within the predetermined time period, logging the one or more unique address in memory with an indication that the at least one sensor did not detect the user performing the action within the predetermined time period; and one or more identification tags comprising: an antenna for receiving the low energy Bluetooth notification from the radio; an RF chip operatively coupled to the antenna, wherein the RF chip is configured to transmit at least one unique address to the radio; and a battery operatively coupled to the RF chip.

CONCLUSION

Many modifications and other embodiments of the invention may come to mind to one skilled in the art to which this invention pertains having the benefit of the teachings presented in the foregoing descriptions and the associated drawings. While examples discussed above cover the use of the invention in the context a content management service, the invention may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A system for tracking and improving hand hygiene comprising:

a hand hygiene dispenser station operatively connected to a hand hygiene product dispenser for dispensing a hand hygiene product, the hand hygiene dispenser station comprising:

at least one sensor configured to detect when an action to receive the hand hygiene product is performed by the hand hygiene product dispenser, the at least one sensor operatively coupled to at least one processor; and a wirelessly adjustable proximity sensor configured to determine when an object is within a predetermined distance from the hand hygiene product dispenser, the proximity sensor operatively connected to the at least one processor, wherein the at least one processor is operatively configured to:

receive from a geographically remote data collection server, environmental programming information including alert parameters;

receive, from the proximity sensor, a proximity indication that a particular object is within the predetermined distance;

upon receiving the proximity indication, determine that the at least one sensor did not detect the action to receive the hand hygiene product within a predetermined time period;

determine that at least one alert parameter included in the environmental programming information received from the geographically remote data collection server is met; and activate an alert at least partially based upon: a) the determination that the at least one sensor did not detect the action to receive the hand hygiene product within the predetermined time period, and b) the determination that at least one alert parameter included in the environmental programming information received from the geographically remote data collection server is met based on a current operating environment of the hand hygiene dispenser station.

2. The system of claim 1, wherein the system further comprises a usage sensor configured to detect an amount of hand hygiene product stored in a housing connected to the hand hygiene product dispenser, the usage sensor operatively coupled to the at least one processor.

3. The system of claim 2, wherein the at least one processor is further configured to, upon receiving a notification from the usage sensor that the hand hygiene product is low, transmit a low hand hygiene product notification.

4. The system of claim 1, wherein the proximity sensor is an ultrasound proximity sensor.

5. The system of claim 1, wherein:

the system further comprises at least one RF chip operatively coupled to the at least one processor;

the at least one processor is further configured to, upon receiving the proximity indication:

broadcast a wireless scan; and based at least in part on broadcasting the wireless scan, receive one or more unique addresses.

6. The system of claim 5, wherein the at least one processor is further configured to, upon determining that the at least one sensor did not detect the user performing the action within the predetermined time period, log the one or more unique addresses in memory with an indication that the at least one sensor did not detect the user performing the action within the predetermined time period.

7. The system of claim 6, wherein:

the system further comprises at least one tag comprising an RF chip operatively coupled to an antenna;

the RF chip is configured to facilitate transmitting, via the antenna, the one or more unique addresses, current battery level, and one or more packets of information; and the one or more packets of information are used to provide classification information and modify system behavior with or without communicating back to a central server.

8. The system of claim 7, wherein the proximity indication is a low energy Bluetooth notification.

9. The system of claim 1, wherein the system further comprises a radio operatively connected to the at least one processor configured to send and receive information from a) a second radio operatively connected to at least one other hand hygiene product dispenser or b) a wireless network hub.

10. The system of claim 9, wherein the at least one processor is configured to receive programming information via the radio.

11. A computer-implemented method for tracking and improving hand hygiene comprising:

providing a hand hygiene dispenser station comprising: 1) at least one sensor configured to detect when a user performs an action to receive a hand hygiene product, the at least one sensor operatively coupled to at least one processor; 2) an electromechanical usage sensor configured to detect when the hand hygiene product is low, the electromechanical usage sensor operatively coupled to the at least one processor; and 3) memory operatively coupled to the at least one processor, wherein the at least one processor is configured for:
receiving, by the at least one processor, from a geographically remote data collection server, environmental alert parameters;
receiving, by the at least one processor, from an ultrasound proximity sensor, a proximity indication that an object is within a predetermined distance of the ultrasound proximity sensor;
upon receiving the proximity indication, receiving, by the at least one processor, one or more broadcasts;
extracting, from the one or more broadcasts:
one or more unique addresses;
one or more battery levels of a broadcasting device; and/or
one or more information packets;
determining, by the at least one processor, that the at least one sensor did not detect the user performing the action within a predetermined time period;
facilitating, by the at least one processor, playing an audio indication based on determining that at least one of the environmental alert parameters received from the geographically remote data collection server are met;
logging by the at least one processor, the one or more unique addresses in memory with an indication that the at least one sensor did not detect the user performing the action within the predetermined time period; and
transmitting the one or more unique addresses received from the tag and the indication that the at least one sensor did not detect the user performing the action within the predetermined time period.

12. The computer-implemented method of claim 11, the method further comprising providing a tag, the tag comprising at least one processor configured for transmitting a broadcast including at least one of the one or more unique addresses.

13. The computer-implemented method of claim 12, wherein the tag is embedded in a badge reel operatively coupled to an identification badge.

14. The computer-implemented method of claim 13, wherein the tag comprises an RF chip, an antenna and a battery.

15. The computer-implemented method of claim 11, wherein the method further comprises, upon facilitating playing the audio indication for the user to perform the action, determining, by the at least one processor, whether the action is performed during a second predetermined time period.

16. The computer-implemented method of claim 15, wherein the method further comprises, upon determining that the action was not performed during the second predetermined time period, logging, by the at least one processor, the one or more unique addresses in memory with an indication that the at least one sensor did not detect the user performing the action within the second predetermined time period.

17. A first hand hygiene detection apparatus and a second hand hygiene detection apparatus, the first hand hygiene detection apparatus and the second hand hygiene detection apparatus operatively connected to a respective hand hygiene product dispenser, the first hand hygiene product dispenser further comprising:
a digital radio operatively connected to at least one processor configured to receive information from the second hand hygiene detection apparatus and/or from a data server; and
memory operatively coupled to the at least one processor, wherein the at least one processor is operatively configured for:
receiving at least one environmental alert parameter from a geographically remote data collection server, wherein the at least one environmental alert parameter comprises one or more of the following: time of day, location, and objects detected;
receiving a dispensing event indication, from the digital radio, that a dispensing event associated with a particular unique address occurred at the second hand hygiene detection apparatus;
storing the dispensing event indication in memory;
receiving, from an ultrasound proximity sensor, a proximity indication that an object is within a predetermined distance of the first hand hygiene product dispenser;
upon receiving the proximity indication:
transmitting a proximity indication to at least one tag; and
based on transmitting the proximity indication, receiving one or more unique addresses from the at least one tag;
determining that the one or more unique addresses includes the particular unique address, determining whether the dispensing event occurred within a predetermined amount of time;
facilitating playing of an audio reminder upon determining that the dispensing event did not occur within the predetermined amount of time or upon determining that the one or more unique addresses does not include the particular unique address, and upon determining that the at least one environmental alert parameter from the geographically remote data collection server has been met.

18. The first hand hygiene detection apparatus and the second hand hygiene detection apparatus of claim 17, wherein the at least one processor is further configured for, upon determining that the dispensing event did not occur within the predetermined amount of time, determining whether the first hand hygiene detection apparatus dispenses an anti-bacterial solution within a predetermined amount of time.

19. The first hand hygiene detection apparatus and the second hand hygiene detection apparatus of claim 18, wherein the at least one processor is further configured for, upon determining that the first hand hygiene detection apparatus did not dispense the anti-bacterial solution within the predetermined amount of time, creating and storing in memory a data entry indicating the one or more unique addresses and that the first hand hygiene detection apparatus did not dispense the anti-bacterial solution within the predetermined amount of time.

* * * * *